WILLIAM CLEMSON.

Improvement in Cross-Cut Saws.

No. 118,198.            Patented Aug. 22, 1871.

UNITED STATES PATENT OFFICE.

WILLIAM CLEMSON, OF MIDDLETOWN, NEW YORK.

IMPROVEMENT IN CROSSCUT-SAWS.

Specification forming part of Letters Patent No. 118,198, dated August 22, 1871.

*To all whom it may concern:*

Be it known that I, WILLIAM CLEMSON, of Middletown, in the county of Orange, in the State of New York, have invented certain Improvements in Crosscut-Saws, of which the following is a specification:

The object of this invention is to improve what is generally known as the Tuttle saw; and it consists in the shape and arrangement of the teeth that compose the saw.

Figure 1:
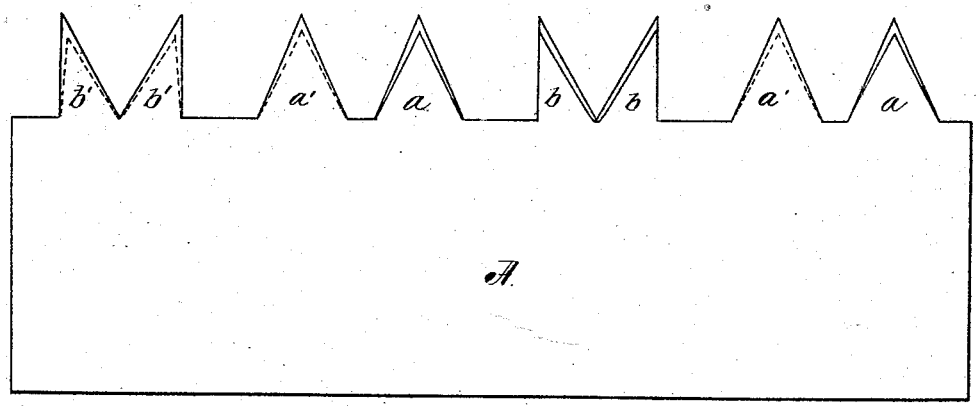
Figure 2:
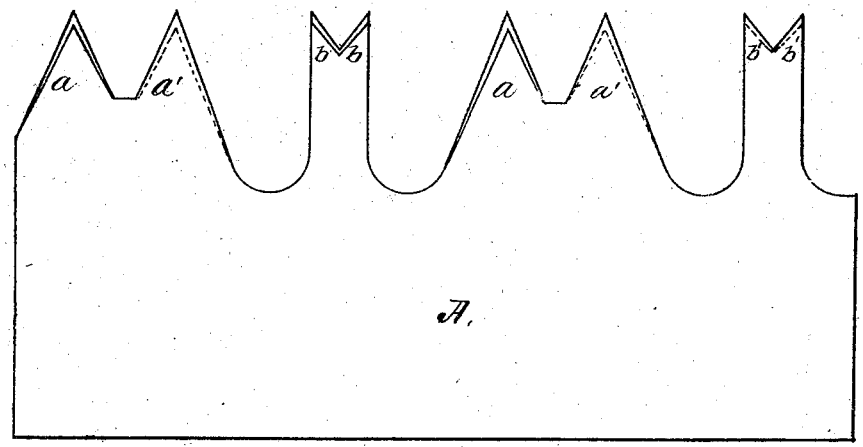

In the drawing, Figure 1 shows a section of a saw-blade having the teeth made in the form and arranged as is hereafter described; and Fig. 2 is a section of a saw-blade, showing a modification of the same arrangement of cutting-points, but the teeth and dust-spaces unlike those in Fig. 1.

A is a section or part of a blade of a crosscut-saw having the teeth cut on one edge. $a$ and $a'$ are the ordinary fleam or scoring-teeth. Teeth $a$ are filed beveling and set from one side of the plate, while teeth $a'$ are beveled and set from the opposite side. $b\ b$ are clearing or ripping-teeth, and are in pairs, set back to back, are both filed on their inclined sides with a bevel from the same side of the plate, and are not set to either side of the plate, while the front edges of the teeth are perpendicular, or of the same distance at the cutting-points that they have at their bases. In other words, the front edges are parallel and are filed at right angles with the saw-blade on their front edges. $b'\ b'$ are the same in shape as $b\ b$, but are beveled from the opposite side of the saw. The teeth $a\ a'\ b$ and $b'$ are all the same length, which is not usual in saws having clearer or ripping-teeth that are alternated with fleam or scoring-teeth; and the advantage of this arrangement is this, that, while the pairs of teeth $b$ and $b'$ act as clearers, they also score to the same depth as teeth $a$ and $a'$, and, being beveled only on one side, the other being filed square across and the front side upright, gives a blunter cutting or scoring-point than what is on teeth $a$ and $a'$; and, there being no set in these clearing-teeth, they cut or score inside of the score of the teeth $a$ and $a'$, thus cutting the wood that is removed from the kerf into smaller particles—there being four scores or cuts instead of two in other saws—and when so cut will be easier to remove or be cleared from the kerf, which is done by the blunter points on the pairs of teeth $b$ and $b'$.

A saw having the teeth in the form and arranged so that the pairs of clearing-teeth $b$ and $b'$ will alternate with the scoring-teeth $a$ and $a'$ is easily constructed and kept in order, while there is ample dust-space between the pairs of clearing-teeth and the adjacent scoring-teeth to prevent clogging.

Having thus described my invention, what I claim is—

A saw, having the scoring-teeth $a$ and $a'$ and pairs of clearing or ripping-teeth $b$ and $b'$, constructed and arranged with relation to each other, as herein described and shown.

WM. CLEMSON.

Witnesses:
NEWTON CRAWFORD,
GEO. C. POULTON.